United States Patent

Wyse

[11] 3,891,827
[45] June 24, 1975

[54] ELECTRICAL HEATING DEVICE FOR USE WITH AEROSOL CONTAINERS

[75] Inventor: Harold G. Wyse, Dayton, Ohio

[73] Assignee: Gad-Jets, Inc., Dayton, Ohio

[22] Filed: Jan. 12, 1973

[21] Appl. No.: 323,037

[52] U.S. Cl. .............. 219/302; 174/52 PE; 219/214; 219/305; 219/328; 219/441; 222/146 HA; 239/135
[51] Int. Cl. ........ H05b 1/02; B67d 5/62; F24h 1/12
[58] Field of Search ........................ 219/296–299, 219/302–305, 328, 441, 436, 438, 214, 251–255, 311, 442, 449, 464, 510–512, 494, 551; 222/146 R, 146 H, 146 HE, 146 HA; 239/135, 133; 174/52 PE; 338/254, 255

[56] References Cited
UNITED STATES PATENTS

| 941,215 | 11/1909 | Wade | 219/303 |
|---|---|---|---|
| 2,486,865 | 11/1949 | Montague | 338/254 |
| 2,816,207 | 12/1957 | Boggs | 219/328 X |
| 2,833,909 | 5/1958 | Levey | 219/298 |
| 2,850,687 | 9/1958 | Hammes | 174/52 PE UX |
| 2,915,614 | 12/1959 | Loomis | 219/441 |
| 2,925,599 | 2/1960 | Wells | 337/380 |
| 2,971,077 | 2/1961 | Palmer | 219/441 X |
| 3,043,943 | 7/1962 | Moot | 219/449 |
| 3,116,403 | 12/1963 | Carter | 219/214 |
| 3,338,476 | 8/1967 | Marcoux | 219/214 |
| 3,358,885 | 12/1967 | Flowers | 219/214 UX |
| 3,381,115 | 4/1968 | Welch | 219/441 |
| 3,439,150 | 4/1969 | Wells et al. | 219/510 X |
| 3,476,293 | 11/1969 | Marcoux | 222/146 HA |
| 3,518,410 | 6/1970 | Dillarstone | 219/214 X |
| 3,527,922 | 9/1970 | Reich et al. | 219/308 |
| 3,710,985 | 1/1973 | Baum | 219/302 X |

FOREIGN PATENTS OR APPLICATIONS

| 854,403 | 11/1952 | Germany | 219/305 |
|---|---|---|---|
| 222,081 | 6/1959 | Australia | 219/303 |

Primary Examiner—A. Bartis
Attorney, Agent, or Firm—Biebel, French & Bugg

[57] ABSTRACT

A heater includes a housing enclosing a heat exchanger, an aerosol can adapter for attaching the heater to an aerosol shaving cream can, a stem for actuating the aerosol can valve, and resilient foam insulation between the can and the heat exchanger. The heat exchanger has a cavity in one side receiving an electric heating element and a spiral heating passage in the other side to provide long residence times for heating fluids forced through the passage. A thermosetting epoxy material provides electrical and heat insulation for the heater. Additional foam may be used for filling an electrical connection cavity above the heat exchanger, or the heat exchanger electrical connections may be encapsulated along with the heat exchanger by injection molding.

21 Claims, 22 Drawing Figures

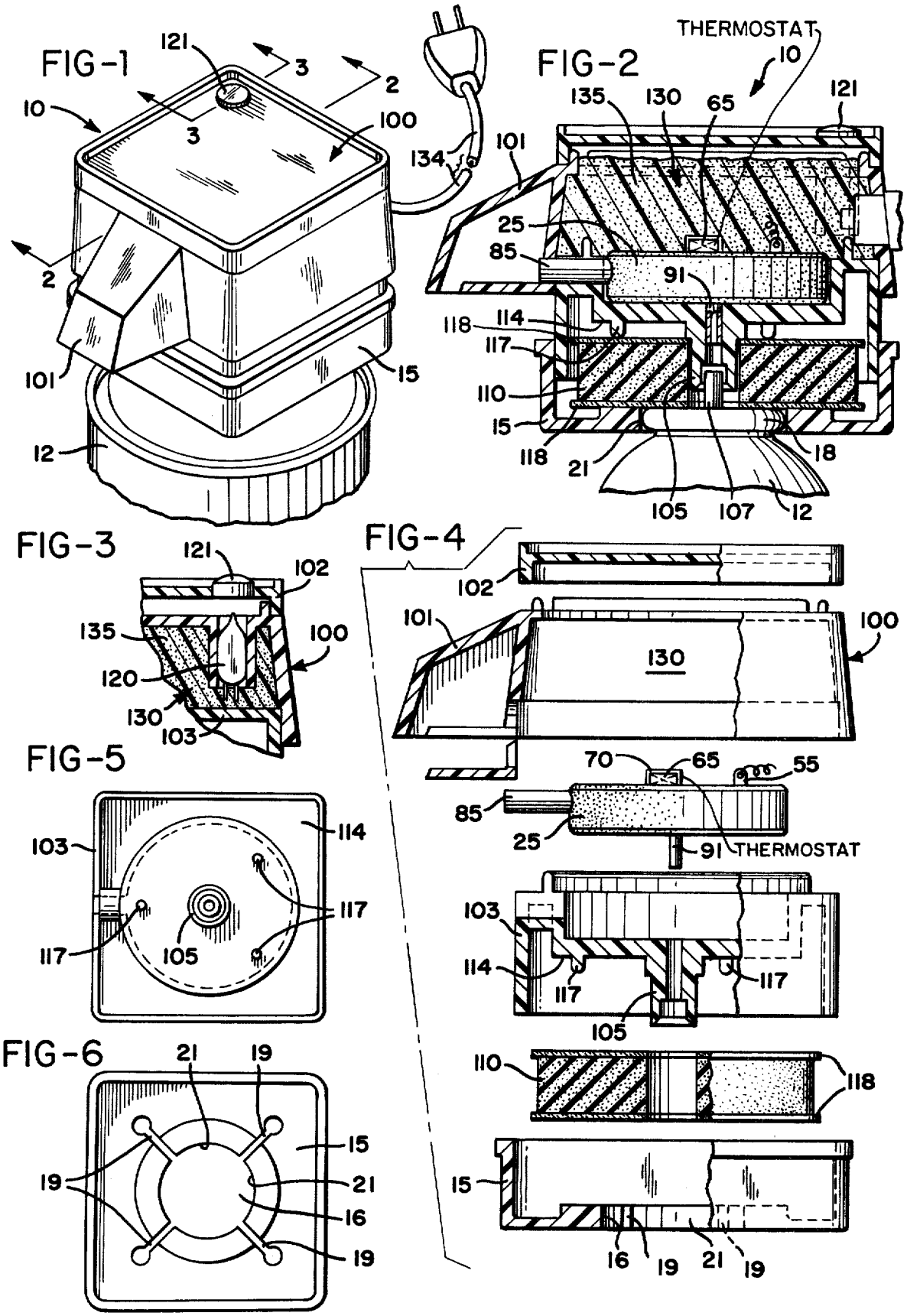

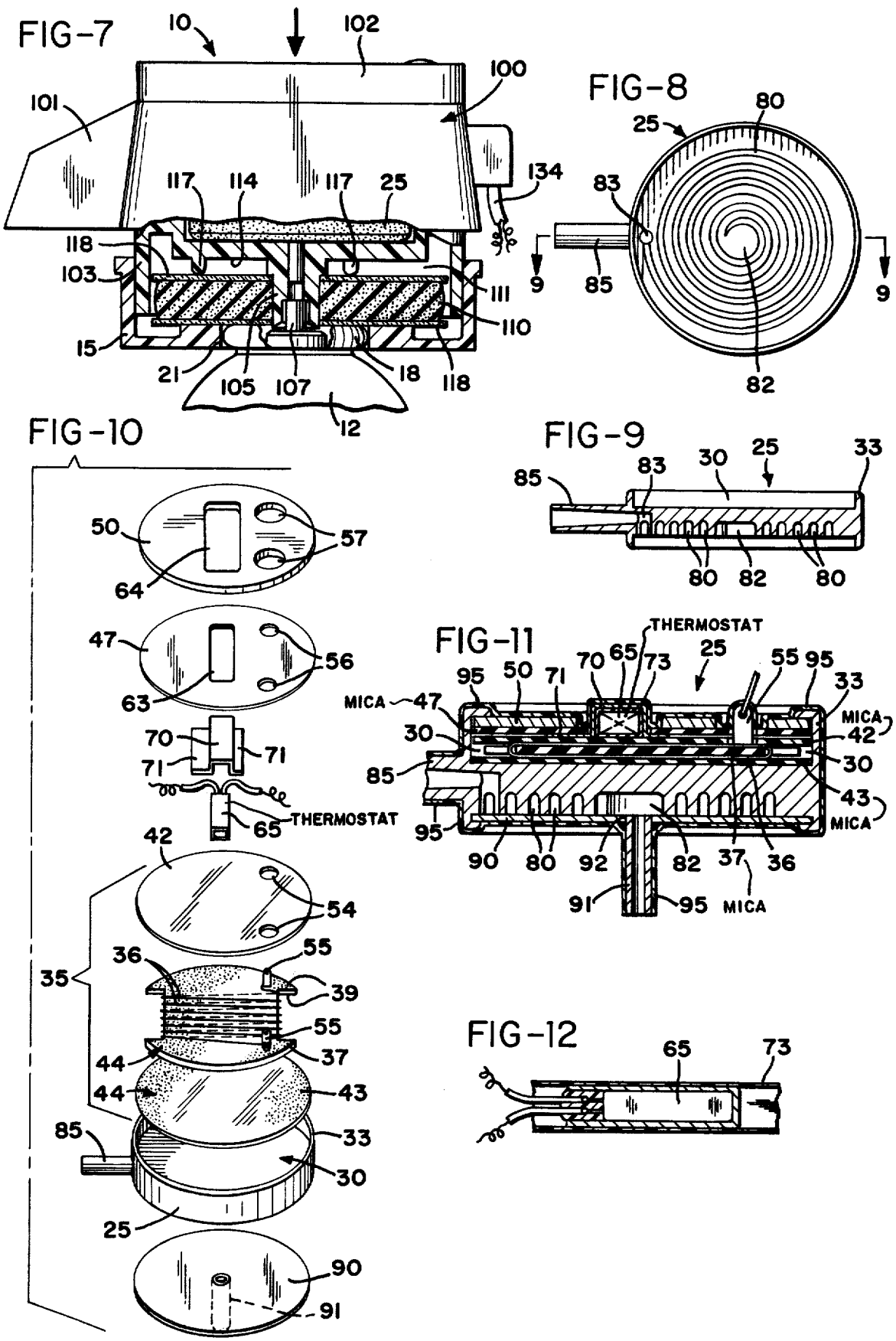

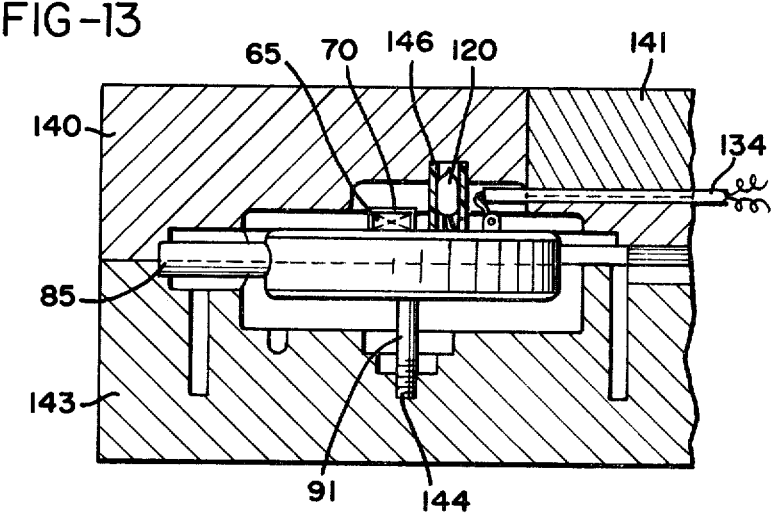
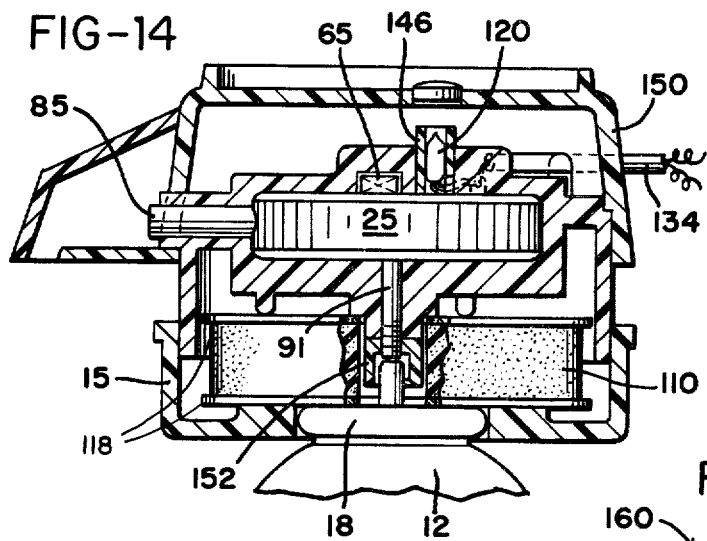
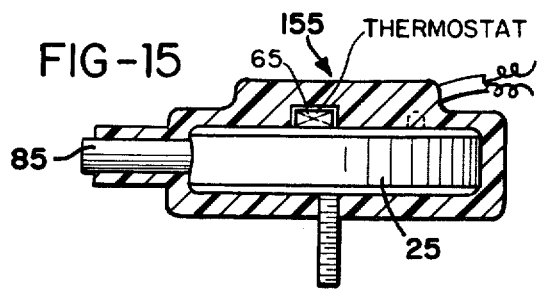
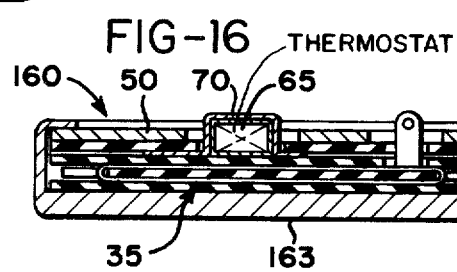
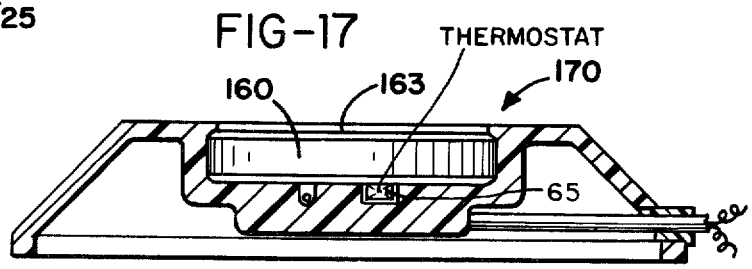

ELECTRICAL HEATING DEVICE FOR USE WITH AEROSOL CONTAINERS

BACKGROUND OF THE INVENTION

This invention relates to high heat density electrical heating elements, and more particularly to a heater for heating and dispensing shaving cream lather as it issues on demand from a conventional aerosol can.

Until recently, hot lather for shaving purposes was generally a luxury found only at the barber shop. Few men bother these days to prepare their own lather, preferring instead to draw it cold from aerosol cans. Devices for heating such lather have generally been bulky, expensive, and limited to commercial establishments where the cost and size can be justified.

A few domestic appliances have been proposed, such as those of U.S. Pat. Nos. 3,043,484, 3,111,967, and 3,171,572, but many have been unable to meet the strict safety requirements necessary for domestic use, while others have been awkward, some even requiring specially constructed aerosol cans to meet prevailing safety standards.

Present safety requirements for a domestic lather heater require that it pass a 2,500 volt one minute break-down test, with no leakage to ground, after being submerged under water for 24 hours. Further, these standards permit a rise in the aerosol can temperature of not more than 1°C when the heater is on continuously. A few specially designed lather heaters have been approved, but these do not include an inexpensive heater usable with virtually any commercially available aerosol can.

A further difficulty has been in providing high heat density heating elements for heating purposes in small devices such as this. Constructions having sufficient heat output for this type of application, sufficient longevity, accurate temperature regulation, and readily adaptable to the above types of heat and electrical insulation, have been virtually unavailable heretofore.

SUMMARY OF THE INVENTION

Briefly, this invention provides an electrically and heat insulated heater which may readily be used in a wide variety of applications. The illustrated heater is a lather heater, although other applications and other fluids may also be used. The heater is inexpensive, uncomplicated, and well suited for mass production techniques.

The metallic heat exchanger within the heater is of sufficient size and weight to serve as a heat sink, is generally circular in shape, and has a heating element cavity on one side thereof.

The heating element cavity may be either an open, cylindrical cavity for receiving an electric card wound resistance heating element, or generally spiral in shape for receiving a conventional electric cord heater. In the preferred embodiment the heating element is an electric card wound resistance heating element bonded by an inorganic cement to mica cover sheets on either side thereof, forming a heating element sandwich.

The heating element is attached to the heat exchanger either directly by means of an appropriate heat resistant epoxy, or by means of a heating element cover plate which is placed over the heating element in the cavity. When the cover plate is used, the cavity walls are formed and clamped over the cover plate to retain the cover plate tightly in place against the heating element.

A hermetically sealed thermostat is supported adjacent the heating element by an oven clamp which is either attached to the heat exchanger or held in position by the cover plate. The thermostat controls the supply of electrical current to the heating element and is adjusted to maintain the heat exchanger at a temperature of approximately 240°F.

In the preferred embodiment the heating element cover plate has an opening passing therethrough and the thermostat and thermostat oven clamp are located in this opening free of contact with the heating element cover plate. The thermostat oven has tabs extending outwardly adjacent the heating element sandwich and beneath the heating element cover plate to enable the cover plate to hold the oven clamp and thermostat tightly against the heating element sandwich. An additional mica sheet is located between the oven tabs and the cover plate to keep the oven free of contact with the cover plate. This arrangement brings the thermostat and thermostat oven into intimate contact with the heating element assembly itself, causing the thermostat to sense the heat from the heating element faster than the heat exchanger and cover plate. The thermostat thus anticipates the temperature of the heat exchanger rather than following, providing sensitive and precise temperature regulation.

A heating passage is provided on the surface of the heat exchanger opposite the heating element cavity. In order to provide a relatively long residence time for the shaving cream fluid, the passage has a generally labyrinthine configuration which, in the preferred embodiment, is a long spiral starting at the center of the heat exchanger and progressing outwardly to the edge. The fluids are kept within the labyrinthine heating passage either by affixing the heat exchanger firmly against a surface of the lather heater housing, or by covering the passage with a separate plenum cover.

The assembled heat exchanger, heating element cover plate, and plenum cover plate are then preheated to an appropriate temperature, typically 400°F, immersed in a fluidized bed of thermo-setting epoxy material, and retained therein until coated as desired. The fluidized bed also contains micro-balloons which form part of the heat exchanger coating. The coating provides electrical and heat insulation for the heat exchanger, isolates the heating element from electrically conductive fluids, and improves the leakage resistance of the plenum cover.

The assembled heat exchanger is incorporated into an appropriately attractive housing having a dispenser spout connected to the heat exchanger heating passage outlet.

The top of the housing includes an electrical connection space above the heat exchanger for connecting the line cord to the thermostat, the heating element, and an optional indicator lamp. In order to insulate the electrical connections in this space and to prevent contact thereof with electrically conductive fluids, the space is filled with an appropriate foam material, following completion of the electrical connections. Alternatively, the heat exchanger, heating element, thermostat, electrical connections, and so on, may all be encapsulated by injection molding to provide a single electrically and heat insulated subassembly which can be easily incorporated into any desired external housing.

An open-top aerosol can adapter, having a shape complementary to the heater housing, receives the housing therein and permits vertical motion relative thereto. The bottom of the adapter has a generally circular cutout therein of an appropriate size to engage a lip on the aerosol can in friction tight relation to retain the aerosol can adapter and the heater housing on the can. Several stress relief slots extend radially from the adapter cutout to facilitate attachment and removal of the can adapter to and from the aerosol can.

The heater housing itself has a stem extending down therefrom which engages the outlet valve on the aerosol can to open the valve when the housing is moved downwardly toward the can. The valve actuator stem is a hollow tube which presses the aerosol can valve downwardly and conducts the shaving cream up into the heat exchanger heating passage inlet.

In order to insulate the aerosol can from the heater and to close the aerosol can valve after the desired amount of material has been drawn therefrom, a resilient foam insulator of any appropriate conventional material, such as polyurethane, is mounted between the heater housing and the can adapter. The foam both insulates the heater from the aerosol can and biases the housing in spring-like fashion away from the can and away from the can adapter. Alternatively, a coil spring may be used, but it is less preferred due to the lack of insulation. A fiber heat shield is attached to each side of the foam and an air space is provided between the polyurethane foam and the heat exchanger, to enhance even further the insulation between the heater and the aerosol can.

In order to insure that the foam will flow into the heat exchanger heating passage and not leak around between the plenum cover and the heater housing, a plenum cover tube extends down from the heating passage opening in the plenum cover into the valve actuation stem to guide the foam directly into the heating passage.

It is therefore an object of this invention to provide a durable, high heat density electrical heater and hermetically sealed thermostatic control which are electrically and heat insulated by a covering of heat resistant material; and to provide an improved electrically and heat insulating coating for a heater in which the coating is applied by the method of preheating the heating element assembly and then immersing the preheated assembly into a fluidized bed of micro-balloons and thermo-setting epoxy to coat the assembly therewith.

It is another object of this invention to provide a heater having a durable, long-lived, high heat density heating element.

It is a further object of this invention to provide a heater which is controlled by a thermostat which anticipates the temperature of the heat exchanger to provide accurate and sensitive temperature control characteristics; and to provide a thermostatically controlled heater and heat exchanger which include a thermostat oven over the thermostat and in which the oven and thermostat are in closer thermal contact with the heating element than the heat exchanger to enhance the temperature control characteristics of the thermostat.

It is still a further object of this invention to provide a heater and heat exchanger which include a plenum cover over the heat exchanger heating passage to retain fluids within the passage as they move therethrough.

It is another object of this invention to provide a heater for use with an aerosol can; and to provide an aerosol can adapter having stress relief slots therein for mounting the heater on the aerosol can for heating the contents thereof.

It is another object of this invention to provide a method for making a heater having the above characteristics.

Other objects and advantages of the invention will be apparent from the following description, the accompanying drawings and the appended claims.

BRIEF DESCRIPTION OF THE DRAWINGS

FIG. 1 is a perspective view of the lather heater of this invention mounted upon an aerosol shaving cream can;

FIG. 2 is a partial cross-sectional view taken on line 2—2 of FIG. 1;

FIG. 3 is a partial cross-sectional view of a fragment taken on line 3—3 of FIG. 1;

FIG. 4 is a partial cross-sectional exploded view of the heater;

FIG. 5 is a bottom view of the heater housing;

FIG. 6 is a top view of the aerosol can adapter;

FIG. 7 is a partial cross-sectional view showing the heater housing moved downwardly toward the aerosol can and can adapter, compressing the resilient foam insulation therebetween;

FIG. 8 is a bottom view of the heat exchanger;

FIG. 9 is a cross-sectional view of the heat exchanger taken generally on line 9—9 of FIG. 8;

FIG. 10 is an exploded perspective view of the heat exchanger and heating element assembly;

FIG. 11 is a cross-sectional view of the assembled elements of FIG. 10, including an insulating polymer coating thereover;

FIG. 12 is a partial cross-sectional view of the hermetically sealed thermostat with an electrical insulating envelope thereover;

FIG. 13 is a partial cross-sectional view of the assembled elements of FIG. 10 mounted in an injection molding die assembly;

FIG. 14 is a partial cross-sectional view of the FIG. 13 heating element and heat exchanger assembly encapsulated according to the FIG. 13 injection mold and incorporated into a lather heater housing having an external appearance indentical to that of FIG. 1;

FIG. 15 is another version of an injection mold encapsulated lather heater;

FIG. 16 is a cross-sectional view of the heating element assembly in a heating element assembly case without the heat exchanger portion;

FIG. 17 is a partial cross-sectional view of the FIG. 16 heater partially encapsulated by injection molding, and usable as a hot plate;

DESCRIPTION OF THE PREFERRED EMBODIMENTS

Figure 18:
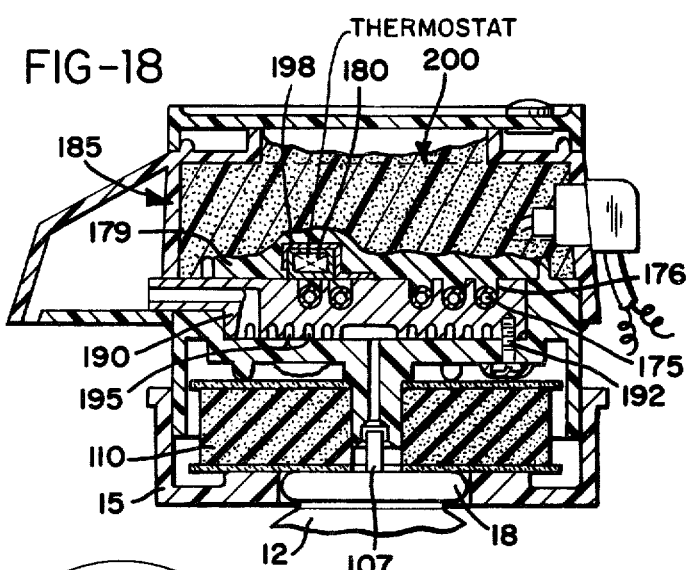
FIG. 18 is a partial cross-sectional view similar to FIG. 2 of an alternative lather heater according to this invention.

With reference to the drawings, and more particularly to FIGS. 1–12, there is illustrated a preferred embodiment of an electrically and heat insulated heater constructed according to this invention. The heater is incorporated into a lather heater 10 which is designed to be attached to a conventional aerosol can 12 containing shaving cream. The heater 10 is mounted upon can 12 by means of an aerosol can adapter 15 which has a circular cutout 16 engaged in friction tight relation onto a lip 18 on top of the aerosol can. Stress relief slots 19 in adapter 15 extend substantially radially from cutout 16 to enable the edges 21 of cutout 16 to flex and yield when adapter 15 is attached to or removed from can 12.

The lather is heated within heater 10 by means of a metallic heat exchanger 25. The size and mass of exchanger 25 are selected to provide sufficient heat capacity relative to the fluids being heated to enable the heater to handle heavy intermittent demands satisfactorily. The heat exchanger thus also functions as a thermal mass heat reservoir or heat sink. In the illustrated embodiment, in which the heater is used domestically for heating shaving cream lather, an aluminum heat exchanger approximately two inches in diameter and one-half inch or less in effective thickness has provided satisfactory heat capacity characteristics for the intermittent types of usage commonly encountered.

A heating element cavity 30 is formed along one side of exchanger 25 and has a formable, relatively non-elastic wall 33 around the periphery thereof. A card wound resistance heating element assembly 35, having an electrical resistance wire 36 wrapped around a mica card 37, is bonded on the major surfaces 39 thereof to mica cover sheets 42 and 43. A heat resistant cement 44 is used to bond sheets 42 and 43 to card 37, and is preferably an inorganic cement such as Sauereisen Insa-Lute adhesive cement No. 1 (Sauereisen Cements Co., Pittsburgh, Pa.), which has high dielectric strength, is an excellent heat conductor, and can withstand temperatures as high as 2,000°F. The cement forms wire 36, card 37, and sheets 42 and 43 into a durable heating element sandwich assembly 35 which is located in cavity 30 in thermal contact with the heat exchanger 25.

An additional mica sheet 47 is placed over the heating element assembly 35, for reasons which will later be explained, and a heating element cover plate 50 is located in cavity 30 over heating element assembly 35 in thermal contact therewith. Heating cavity wall 33 is formed over the edges of cover plate 50, as by bending or clamping, to retain the cover plate and heating element assembly tightly within cavity 30. Wall 33 engages cover plate 50 very tightly to form a good heat conducting relationship therewith, to enable cover plate 50 to conduct part of the heat from heating element assembly 35 into the wall means and into heat exchanger 25.

Electrical terminal openings 54 in upper mica cover sheet 42 provide clearance for the heating element electrical terminals 55 mounted on card 37 and connected to the resistance wire 36. Similar electrical terminal openings 56 and 57 in mica sheet 47 and heating element cover plate 50, respectively, provide access for connecting the resistance wire 36 of the heating element assembly to an external power source, by way of terminals 55.

Similarly, a thermostat opening 63 in mica sheet 47 and a slightly larger thermostat opening 64 in cover plate 50 provide access to the heating element sandwich assembly 35 for a low mass, hermetically sealed thermostat 65. Thermostat 65 is held tight against heating element assembly 35 by a thermostat oven clamp 70 having tabs 71 which extend laterally beneath sheet 47. The cover plate 50 thus bears down firmly against sheet 47 which in turn presses tabs 71 downwardly against assembly 35, holding both the oven 70 and the hermetically sealed thermostat 65 in intimate contact with the heating element sandwich assembly itself.

With this configuration, thermostat 65 and oven 70 are closer thermally to the heating element assembly 35 than either the heat exchanger 25 or the heating element cover plate 50. Further, the opening 64 in cover plate 50 is larger than the dimensions of oven 70, separating the oven from both electrical and thermal contact with the cover plate 50.

As a result, the oven and thermostat sense the heat from the heating element much faster than the heat exchanger 25 and cover plate 50, due to the latter's much larger heat capacity, and also due to the additional mica sheet 47. Thermostat 65 therefore provides high sensitivity for controlling the supply of electrical current to the heating element to control the temperature of the heat exchanger. The thermostat actually anticipates the temperature condition, preventing temperature overrun and protecting the user from possible injury due to burns. The low mass of the thermostat also enables it to cool more quickly, preventing the temperature from dropping too low.

FIG. 12 shows an additional Kapton envelope 73 over thermostat 65, which may be included if the thermostat envelope is not electrically neutral, as is the case with at least one commercially available low mass hermetically sealed thermostat.

In order to maintain the shaving cream lather in contact with the heat exchanger 25 for a sufficient time to heat the lather to the desired temperature, the heat exchanger is provided with a generally labyrinthine heating passage 80 which is located on the heat exchanger 25 separate and on the opposite side thereof from the heating element cavity 30. As may be seen particularly in FIGS. 8, 9, and 11, heating passage 80 is a tight spiral groove located on the surface of the heat exchanger, with an inlet 82 at the center thereof and an outlet 83 at the outer edge thereof. Outlet 83 is in turn connected to a discharge tube 85 to carry the heated lather out of heater 10. Heating passage 80 may have any other configuration, of course, as long as it is sufficiently long to provide the necessary residence time in exchanger 25 to bring the lather up to temperature.

Although heating passage 80 is open on the surface of exchanger 25 in order to facilitate fabrication thereof, the heating passage could also have been contained wholly within the exchanger. This would have the advantage of assuring that the fluid would be forced to flow through the labyrinthine heating passage 80, rather than possible bypassing a portion thereof by "short-circuiting" from one portion to another around the outside of the heat exchanger. In the preferred embodiment, the same advantage is obtained through the use of a plenum cover plate 90 over the heating passage plenum 80.

Plenum cover plate 90 is attached tightly over passage 80 and retains the shaving cream or other fluids therein to assure the proper residence time in the heat exchanger. A plenum cover tube 91 connected with a plenum cover inlet 92 which opens to the inlet 82 of heating passage 80. Plenum cover tube 91 thus serves to conduct the shaving cream or other fluid through the plenum cover directly into the heating passage 80. Means may also be provided in plenum cover plate 90 adjacent heating passage outlet 43 for removing the heated fluid through the plenum cover, although in the preferred embodiment the discharge tube 85 discharged through the side of exchanger 25, and not through plenum cover plate 90.

In order to seal the plenum cover plate 90, thermostat 65, thermostat oven 70, and heating element cover plate 50 onto heat exchanger 25, the assembled heat exchanger, heater assembly, heating element cover plate, plenum cover plate, thermostat, oven, etc., are covered and sealed on the exterior by a heat resistant polymer material 95 (FIG. 11). In the preferred embodiment the heat resistant polymer coating 95 is a thermo-setting epoxy resin which is applied by first heating the assembled heat exchanger, cover plates, etc., and then immersing the preheated assembly into a fluidized bed of the epoxy for a time sufficient to achieve the desired coating thickness. Successful results have been obtained using Minnesota Mining and Manufacturing Scotch Coat No. 117 epoxy, preheating the heat exchanger and cover plate assembly to 400°F and immersing the preheated assembly for three seconds, resulting in a coating approximately 2 mils thick. The coating rate under these conditions is about one and one-half seconds per mil of thickness. The epoxy coating also has high dielectric properties, providing good electrical insulation, and is also effective as a thermal insulator. Further, it seals the heating element from contact with electrically conductive fluids.

In order to increase further the heat insulating properties of the epoxy coating, glass or phenolic micro-balloons, such as Emerson & Cuming's glass microballoons No. IG-101 (Emerson & Cuming, Inc., Northbrook, Ill.), and of a specific gravity similar to that of the epoxy powder, are added to the epoxy powder in the fluidized bed. The micro-balloons comprise approximately 20 to 50 percent of the material in the fluidized bed and become incorporated into the epoxy coating on the exchanger exterior. The importance of the epoxy-micro-balloon coating resides not only in the increased efficiency of the heat exchanger due to the reduced heat losses, but also in the high quality seal which is provided by the use of fluidized bed coating. The coating may be applied quickly, conveniently, and inexpensively, and the failure rate is extremely low.

Another advantage of the fluidized bed coating is that the thermostat may be coated along with the heat exchanger and heater cover plate. The thermostat and thermostat oven are thus insulated from the external environment and sense the temperature of the heating element assembly instead, for even more precise temperature control. Another importance of the hermetically sealed thermostat is that it may be fully coated with coating 95, whereas this would be impossible with exposed thermostatic elements.

A housing 100 having a separately attached top member 102 and bottom member 103 forms the exterior of the lather heater 10, and encloses and supports the assembled and epoxy coated heat exchanger 25, heating element assembly 35, heating element cover plate 50, plenum cover plate 90, etc. Housing 100 has a spout 101 thereon covering the discharge end of tube 85 in order to provide an attractive downward discharge guide for the heated lather as it exists from heater 10.

Housing 100 is movably received in the aerosol can adapter 15 so that the housing can move up and down with respect to the adapter, and hence with respect to an associated aerosol can 12. A hollow valve actuation stem 105 extends downwardly from the bottom of housing 100. Movement of housing 100 downwardly with respect to adapter 15 and can 12 will then move valve actuation stem 105 downwardly against aerosol can valve 107 to open the valve for the release of the aerosol can contents, such as shaving cream. Stem 105 is hollow and received plenum cover tube 91 in a tight fit therein to guide the lather into tube 91 and from their to the heat exchanger heating passage inlet 82. The close fit between plenum cover tube 91 and actuation stem 105 prevents leakage of the shaving cream fluid into the heater housing 100 between the housing and the plenum cover plate 90.

In order to return aerosol can valve 107 to its off position and to insulate the aerosol can 12 from the lather heater 10, a block of resilient foam insulation 110 is mounted on the underside of housing 100 between housing 100 and adapter 15. The resilient foam insulation engages adapter 15 in a spring-like fashion to bias housing 100, and hence heater 10 and actuation stem 105, away from the aerosol can 12, to return valve 107 to the closed position.

To draw lather from the can and through the heater, the user simply presses downwardly on the top of the housing 100 and against foam 110. The foam compresses and allows valve actuation stem 105 to open valve 107, releasing the pressurized fluids within can 12. The fluids are driven through the heating passage 80 where they are heated to the desired temperature, and then issue through spout 101. When the desired quantity of heated fluid has been drawn, the user simply releases the pressure on the top of housing 100, and the resilient foam 110 lifts the heater away from adapter 15 and can 12, allowing valve 107 to close.

In order to enhance the insulating properties of the resilient foam insulation 110, an air space 111 is maintained between foam 110 and the bottom 114 of housing 100 by means of air space projections 117 which hold the foam away from housing bottom 114. Fiber heat shields 118 are also included on each side of foam insulation 110.

An optional neon indicator lamp 120 may be included in housing 100 to indicate the condition of heater 10. An appropriate opening 121 in housing 100 accommodates the neon indicator. The indicator may be connected as in FIG. 21 to indicate when the heat exchanger 25 is being heated, or as in FIG. 22 to indicate when the heat exchanger is in readiness (up to temperature).

An electrical connection space 130 is provided in housing 100 adjacent the heating element cover plate 50 and between cover plate 50 and the top 102 of housing 100. Space 130 provides a convenient region for connecting the thermostat 65, indicator lamp 120, heating element 35, and line cord 134. In order to insulate these electrical connections in space 130 and to prevent contact thereof with electrically conductive fluids, space 130 is then filled with an appropriate foam insulating material. In the preferred embodiment, a low temperature foam 135 such as General Electric Noryl foam has proven both economical and effective. An additional advantage resulting from the use of the heating element cover plate 50 and epoxy coating 95 in this invention is that cover plate 50 prevents hot spots adjacent foam 135 by distributing the heat and conducting it into the heat exchanger 25. Thermostat 65 also prevents cover plate 50 from becoming too hot by anticipating the heat rise and controlling the temperature accordingly. As a result, a relatively low temperature foam such as the Noryl foam (which does not break down at temperatures below 270°F) may be used with this invention.

In practice, when thermostat 65 has been adjusted to maintain heat exchanger 25 at 240°F, this invention has heated shaving cream lather to a desirable temperature of 180°F, in the quantity necessary for domestic use, with no difficulty.

Figure 21:
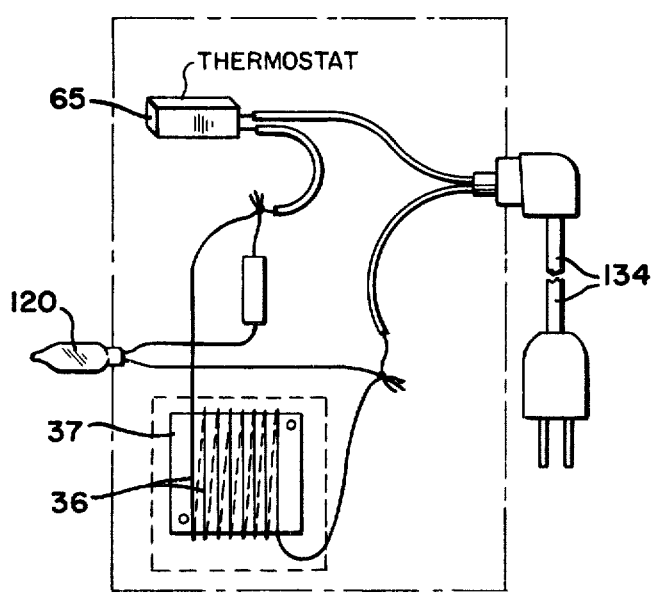
FIG. 21 is a wiring diagram for the heater.
Figure 22:
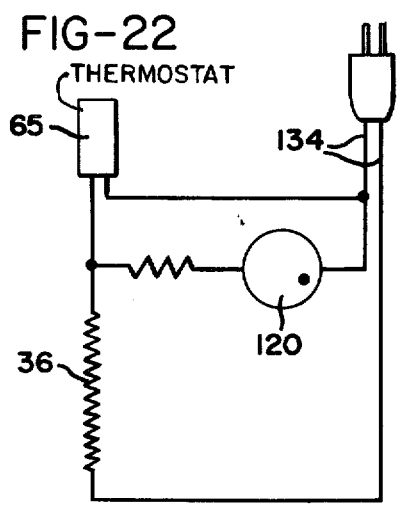
FIG. 22 is an alternate wiring diagram.

With reference to FIGS. 13–15, there is illustrated a modified form of lather heater subassembly which may be fabricated by injection molding for incorporation into virtually any appropriate cosmetic housing. The assembled heat exchanger unit 25 having the heating element assembly 35, heating element cover plate 50, plenum cover plate 90, plenum cover tube 91, discharge tube 85, etc., assembled thereon and connected electrically according to either FIG. 21 or FIG. 22, is then enclosed in upper and lower die members 140, 141, and 142, for injection molding. The bottom of plenum cover tube 91 is inserted at 144 into a smooth bore in lower die half 142 to support the heat exchanger assembly 25 within the assembled die halves 140–142. A neon lamp cover tube 146 surrounds neon lamp 120 to protect it from intense pressure of injection molding and also to prevent the neon lamp from being entirely covered during the injection molding process.

The heat exchanger assembly is then encapsulated by injection molding with a suitable polymer, to provide electrical and heat insulation, and to seal and isolate the heating element sandwich assembly, the thermostat, the neon indicator, the electrical connections, and the line cord end from contact with electrically cnductive fluids. The epoxy coating 95 has been eliminated in this embodiment, but may also be included if desired.

FIG. 14 illustrates the encapsulated assembly resulting from FIG. 13 incorporated into a matching housing 150 having an external appearance virtually identical to that of housing 100, and accepting the same resilient foam insulation 110, fiber heat shields 118, aerosol can adapter 15, etc. A valve actuation piece 152 is threaded onto the threaded end of plenum tube 91 to provide the same function provided by valve actuation stem 105.

FIGS. 15, 16, and 17 illustrate other variations of this invention. In FIG. 15 the bottom of the lather heater housing has not been included as part of the injection molded assembly. Instead, a universal lather heater subassembly 155 has been provided which fully meets all present safety standards, and which is highly compact and may be enclosed in any desired cosmetic housing. Universal subassembly 155 thus provides a single assembly which may be sold under a wide variety of external appearances to suit the desires of individual manufacturers.

FIG. 16 illustrates a heater constructed according to this invention in which the heating passage 80, plenum cover plate 90, plenum cover tube 91, and discharge tube 85 have been omitted. The heat exchanger itself, therefore, serves as a heating element assembly case 162 in which the same heating element sandwich assembly 35, additional mica sheet 47, heating element cover plate 50, thermostat 65, and thermostat oven 70 are enclosed. Heater 160 is thus a compact, high heat density, well regulated heating element. All that is necessary to make heater 160 applicable to a lather heater such as those of FIGS. 1–15, is to add a heat exchanger assembly to heater 160, as by attaching it to bottom 163 of assembly case 162, or by forming an appropriate labyrinthine heating passage therein.

Alternatively, heater 160 may be used in a wide variety of other applications. For example, FIG. 17 illustrates heater 160 encapsulated by injection molding into a hot plate assembly 170. In this embodiment, the heater 160 has been inverted and the bottom 163 is exposed on the top of the hot plate assembly 170 and serves as the thermostatically regulated heating surface thereof.

Figure 19:
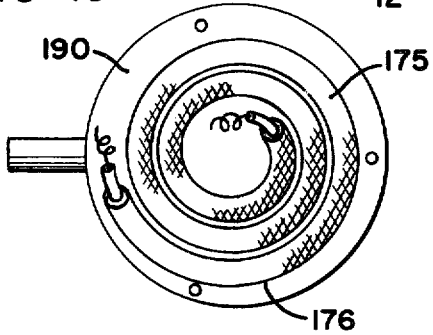
FIG. 19 is a top view of the heat exchanger of the FIG. 18 lather heater, showing the rope-type heating element incorporated therein.
Figure 20:
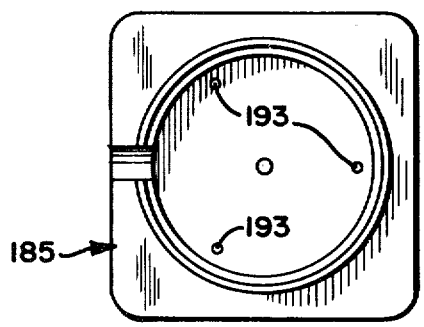
FIG. 20 is a top view of the bottom of the housing.

Other embodiments of this invention will, of course, occur to those skilled in the art. For example, FIGS. 18–20 illustrate an embodiment wherein a conventional rope heating element 175 is located in a spiral shaped heating element cavity 176 and held in cavity 176 by means of an appropriate epoxy material 179 which pots element 175 into cavity 176. The epoxy material 179 is simply poured over element 175 to fill the region about cavity 176 to pot the hermetically sealed thermostat 180 therein. The epoxy material 179 in this case also provides thermal and electrical insulation for the rope heating element 175, but greater care is required in potting this embodiment to ensure the proper insulation. Experience has shown that the epoxy can form bubbles which can lead to failure of the electrical insulation. As a result, this embodiment is less preferred than those of FIGS. 1–15.

The alternative embodiment of FIGS. 18–20 employs the same aerosol can adapter 15, form block 110, etc., as the preferred embodiment of FIGS. 1–15, although the housing 185 is slightly modified to enable the heat exchanger 190 to be held tightly against the bottom thereof by screws 192 passing through housing screw holes 193. This is important since this embodiment omits the optional plenum cover plate 90 and plenum tube 91. Instead, heat exchanger 190 is affixed tightly against the bottom of housing 185 to keep the fluids within the labyrinthine heating passage 195. Similarly, the heating element cover plate 50 has been omitted, and thermostat oven 198 is attached directly to heat exchanger 190.

With this embodiment the temperatures in the region above the potting epoxy 179 will usually not be as uniform as those adjacent the heating element cover plate 50 of the preferred embodiment. Hence this embodiment uses a higher temperature heat, water and electrically resistant filler material to fill the electrical connections space 200 between the heat exchanger 190 and the top of the housing 185.

As may be seen, therefore, this invention has numerous advantages. The use of the epoxy material provides the necessary electrical insulation to pass all standards relating to domestic appliances. The fluidized bed coating of the thermo-setting epoxy and micro-balloon insulator also provides thermal insulation for improved efficiency and safety. The heater is uncomplicated, reliable, inexpensive to fabricate, and usable for a wide variety of heating applications. With the use of the aerosol can adapter 15, this invention is particularly well suited for use as a lather heater, and may be used on virtually any existing aerosol shaving cream cans.

The heating element assembly case may have a heat exchanger portion thereon for heating of fluids or other materials, or the heat exchanger portion may be omitted where it is not needed. The heating element cover plate is held in place by the wall means 33, and the wall means may be formed into retaining and heat conducting relationship onto the cover plate either by crimping the walls tightly over onto the heating element cover plate, or by seam welding the walls onto the cover plate. When a heat exchanger is included on the heating element assembly case opposite the heating element cavity, the exchanger and assembly may be considered as one large heat exchanger having the heating element cavity therein.

This invention provides a high head density, yet highly compact, heating element configuration. In practice, a heat density of approximately 100 watts in a diameter of approximately 1 ½ inches has been successfully provided. The heat resistant cement 44, which seals the resistance wire 36 between the mica cover sheets 42 and 43, prevents the wires from shifting and touching when they are heating, expanding, and contracting, and conducts the heat away rapidly, providing long service life for this high heat density structure. The thermostat configuration provides excellent temperature regulation and prevents temperature overruns which would have a tendency to shorten the service life of the heater, as well as to burn the user.

The thermostat oven surrounds the thermostat on all major sides, increasing the sensitivity thereof. Further, the sensitivity of the thermostat can be adjusted by adding additional layers of mica, such as mica sheet 47, either on the heat exchanger side of the heating element sandwich assembly, or between the heating element assembly and the thermostat itself.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:
1. An electrically and heat insulated heater comprising:
   a. a heat exchanger,
   b. means forming a heating element cavity within a portion of said heat exchanger,
   c. electric heating element means in said heating element cavity in thermal contact with said heat exchanger,
   d. temperature control means, including a low mass, sealed thermostat mounted upon and in thermal contact with said heating element means and substantially free of contact with said heat exchanger, to control the supply of electrical current to said heating element for controlling the temperature of said heat exchanger,
   e. an electrically and heat resistant material sealing said heating element and said thermostat in said cavity to insulate and isolate them electrically and from electrically conductive fluids, and
   f. a heating element cover plate mounted on said heat exchanger between said electrical heating element means and said heat resistant material, said cover plate being free from contact with said thermostat.

2. The heater of claim 1 wherein said heat resistant material is a polymer covering, and further comprising micro-balloons imbedded therein to enhance the insulation properties of said heat resistant material.

3. The heater of claim 1 wherein said heating element means further comprises:
   a. a card wound resistance heating element,
   b. mica cover sheets on both major surfaces of said card wound resistance heating element, and
   c. heat resistant inorganic cement means bonding said cover sheets to said heater card to form a heating element sandwich, said thermostat being mounted upon said sandwich in thermal contact with one of said mica cover sheets.

4. The heater of claim 1 further comprising an injection molded polymer encapsulation means around at least part of said heat exchanger to provide electrical and heat insulation, and to seal and isolate said heating element means and electrical connections between at least said heating element means and said thermostat from contact with electrically conductive fluids.

5. An electrically and heat insulated heater comprising:
   a. a heating element assembly case,
   b. means forming a heating element cavity within said case,
   c. formable, relatively non-elastic wall means on the periphery of said cavity,
   d. electric heating element means in said cavity in thermal contact with said case,
   e. temperature control means, including a low mass, sealed thermostat mounted upon and in thermal contact with said heating element means and substantially free of contact with said case, to control the supply of electrical current to said heating element for controlling the temperature of said case,
   f. a heating element cover plate in said heating element cavity over said heating element means and in thermal contact therewith, said heating element cover plate retaining said heating element means in said cavity and being free from contact with said thermostat, and said wall means being formed in retaining and heat conducting relationship onto said cover plate to retain said heating element means and said cover plate in said cavity and to conduct at least part of the heat from said heating element means into and through said cover plate into said wall means and said case,
   g. a heat resistant coating on at least a portion of the exterior of said case, heating element means, thermostat, and cover plate to provide electrical and heat insulation and to seal and isolate said heating element means from contact with electrically conductive fluids,
   h. means forming a heat exchanger on said heating element assembly case, and i. means forming a heating passage in said heat exchanger and separate from said heating element cavity, said heating passage having an inlet and an outlet.

6. The heater of claim 5 wherein said heat resistant coating includes a thermo-setting epoxy, and further comprising micro-balloons imbeded therein to enhance the insulation properties of said coating.

7. The heater of claim 5 wherein said heating element means further comprises:
   a. a card wound resistance heating element,
   b. mica cover sheets on both major surfaces of said card wound resistance heating element, and
   c. heat resistant inorganic cement means bonding said cover sheets to said heater card to form a heating element sandwich, said thermostat being mounted upon said sandwich in thermal contact with one of said mica cover sheets.

8. The heater of claim 5 further comprising:
   a. means forming a thermostat opening in said heating element cover plate, said thermostat being located in said opening free of contact with said cover plate, and
   b. thermostat oven means over said thermostat and in said cover plate thermostat opening, said thermostat oven means being in thermal contact with said heating element sandwich and being free of contact with said cover plate.

9. The heater of claim 5 further comprising:
   a. a housing means enclosing and supporting said heating element assembly case and heat exchanger,
   b. means for attaching said housing to a fluid source, and
   c. heat insulation means mounted between said heat exchanger and the fluid source.

10. The heater of claim 9 wherein said heat insulation means includes a foam insulation.

11. The heater of claim 10 further comprising:
    a. means forming a space between said foam insulation means and said heat exchanger, and
    b. fiber heat shield means on at least a portion of said foam insulation means.

12. An electrically and heat insulated heater comprising:
    a. a heat exchanger,
    b. means forming a heating element cavity within a portion of said heat exchanger,
    c. formable, relatively non-elastic wall means on the periphery of said cavity,
    d. an electric card wound resistance heating element in said heating element cavity and in thermal contact with said heat exchanger,
    e. mica cover sheets on both major surfaces of said card wound resistance heating element,
    f. heat resistant inorganic cement bonding said cover sheets to said heater card to form a heating element sandwich,
    g. a heating element cover plate in said heating element cavity over said heating element sandwich and in thermal contact therewith, said heating element cover plate retaining said heating element sandwich in said cavity, and said wall means being formed in retaining and heat conducting relationship over said cover plate to retain said heating element and said cover plate in said cavity and to conduct at least part of the heat from said heating element into and through said cover plate into said wall means and into said heat exchanger,
    h. temperature control means, including a low mass, sealed thermostat mounted upon and in thermal contact with said heating element sandwich, to control the supply of electrical current to said heating element for controlling the temperature of said heat exchanger,
    i. means forming a thermostat opening in said heating element cover plate, said thermostat being located in said opening free of contact with said cover plate,
    j. thermostat oven means over said thermostat and in said cover plate thermostat opening, said thermostat oven means being in thermal contact with said heating element sandwich and being free of contact with said cover plate,
    k. at least one additional mica sheet mounted between said heating element sandwich and said heating element cover plate and located at least in part between said oven means and said cover plate,
    l. means forming an open, generally labyrinthine heating passage adjacent a surface of said heat exchanger separate from said heating element cavity, said heating passage having an inlet and an outlet,
    m. a plenum cover plate over said heating passage to retain fluids within said passage,
    n. means forming external inlet and outlet connections connecting with said heating passage inlet and outlet,
    o. a heat resistant polymer and micro-balloon coating on the exterior of said heat exchanger, said heating element cover plate, and said plenum cover plate to seal said cover plates on said heat exchanger, to provide electrical and heat insulation, and to seal and isolate said heating element from contact with electrically conductive fluids,
    p. housing means enclosing and supporting said heat exchanger,
    q. an aerosol can adapter engageable with said housing means, said adapter having a circular cutout therein adapted to engage a lip on an aerosol can in friction tight relation to retain said aerosol can adapter and said heater on the aerosol can, said aerosol can adapter also including at least one stress relief slot therein extending susbstantially radially from said cutout to facilitate attachment and removal of said can adapter to and from an aerosol can,
    r. valve actuation means for actuating a valve on the aerosol can and directing the fluid issuing therefrom to said heating passage inlet in response to movement of said heater toward said aerosol can adapter,
    s. resilient foam insulation means mounted on said heater between said heater and said adapter and resiliently engageable in spring-like fashion with said aerosol can adapter to bias said heater away from the aerosol can,
    t. means forming an electrical connection space in said housing adjacent said heating element cover plate, and
    u. electrical, water, and heat resistant foam substantially filling said electrical connection space to insulate electrical connections therein and to prevent contact thereof with electrically conductive fluids.

13. The heater of claim 12 wherein said polymer is a thermo-setting epoxy resin, and further comprising:
  a. means forming a space between said foam insulation means and said heat exchanger, and
  b. fiber heat shield means on at least a portion of said foam insulation means.

14. An electrically and heat insulated heater comprising:
  a. a heating element assembly case,
  b. means forming a heating element cavity within said case,
  c. formable, relatively non-elastic wall means on the periphery of said cavity,
  d. electric heating element means in said cavity in thermal contact with said case,
  e. temperature control means, including a low mass, sealed thermostat mounted upon and in thermal contact with said heating element means and substantially free of contact with said case, to control the supply of electrical current to said heating element for controlling the temperature of said case, and
  f. a heating element cover plate in said heating element cavity over said heating element means and in thermal contact therewith, said heating element cover plate retaining said heating element means in said cavity and being free from contact with said thermostat, and said wall means being formed in retaining and heat conducting relationship onto said cover plate to retain said heating element means and said cover plate in said cavity and to conduct at least part of the heat from said heating element means into and through said cover plate into said wall means and said case.

15. The heater of claim 14 further comprising a heat resistant coating on at least a portion of the exterior of said case, thermostats and cover plate to provide electrical and heat insulation and to seal and isolate said heating element means from contact with electrically conductive fluids.

16. The heater of claim 14 wherein said heating element means further comprises:
  a. a card wound resistance heating element,
  b. mica cover sheets on both major surfaces of said card wound resistance heating element, and
  c. heat resistant inorganic cement means bonding said cover sheets to said heater card to form a heating element sandwich, said thermostat being mounted upon said sandwich in thermal contact with one of said mica cover sheets.

17. The heater of claim 14 further comprising:
  a. means forming a thermostat opening in said heating element cover plate, said thermostat being located in said opening free of contact with said cover plate, and
  b. thermostat oven means over said thermostat and in said cover plate thermostat opening, said thermostat oven means being in thermal contact with said heating means and being free of contact with said cover plate.

18. The heater of claim 5 further comprising an injection molded polymer encapsulation means around at least part of said case and cover plate to provide electrical and heat insulation, and to seal and isolate said heating element means and electrical connections between at least said heating element means and said thermostat from contact with electrically conductive fluids.

19. An electrically and heat insulated heater comprising:
  a. a heat exchanger,
  b. means forming a heating element cavity within a portion of said heat exchanger,
  c. electric heating element means in said heating element cavity in thermal contact with said heat exchanger,
  d. temperature control means, including a low mass, sealed thermostat mounted upon and in thermal contact with said heating element means and substantially free of contact with said heat exchanger, to control the supply of electrical current to said heating element for controlling the temperature of said heat exchanger,
  e. an electrically and heat resistant material sealing said heating element and said thermostat in said cavity to insulate and isolate them electrically and from electrically conductive fluids, and
  f. thermostat oven means over said thermostat and in thermal contact with said heating means.

20. An electrically and heat insulated heater comprising:
  a. a heat exchanger,
  b. means forming a heating element cavity within a portion of said heat exchanger,
  c. electric heating element means in said heating element cavity in thermal contact with said heat exchanger,
  d. temperature control means, including a low mass, sealed thermostat mounted upon and in thermal contact with said heating element means and substantially free of contact with said heat exchanger, to control the supply of electrical current to said heating element for controlling the temperature of said heat exchanger,
  e. an electrically and heat resistant material sealing said heating element and said thermostat in said cavity to insulate and isolate them electrically and from electrically conductive fluids, and
  f. means forming a heating passage in conjunction with said heat exchanger and separate from said heating element cavity, said heating passage having an inlet and an outlet.

21. The heater of clain 20 further comprising:
  a. a housing means enclosing and supporting said heat exchanger,
  b. means for attaching said housing to a fluid source, and
  c. heat insulation means mounted between said heat exchanger and the fluid source.

* * * * *